UNITED STATES PATENT OFFICE.

AUGUSTUS C. TEUBNER, OF NEW YORK, N. Y.

COMPOSITION FOR RENDERING TEXTILE AND OTHER FABRICS AIR AND WATER TIGHT.

Specification forming part of Letters Patent No. 31,195, dated January 22, 1861.

*To all whom it may concern:*

Be it known that I, AUGUSTUS C. TEUBNER, of the city of New York, in the county and State of New York, have invented a certain new and useful Composition for Rendering Linen, Silk, Cotton, and other Fabrics Air and Water Tight; and I do hereby declare the following to be a full, clear, and exact description thereof.

This composition I prepare in the following manner and of the ingredients herein named: I place in an earthen or porcelain vessel of suitable form and size, one gallon of pure oil of turpentine, in which I also add one-half a pound of pulverized sugar of lead and eight pounds of balsam of fir. The vessel should be in a sand bath and subjected to such degree of heat as will effect the solution of these articles, the balsam of fir being stirred into the turpentine. I also place in another vessel one gallon of pure oil of turpentine, to which I add one pound of gum-elastic, which should be in small pieces or shavings. After standing some days, the gum will be thoroughly dissolved. This solution forms the second part of the material for my composition. I place in an iron or metal vessel one-quarter of a pound of gum-elemi and one-quarter of a pound of resin, which I expose to a sufficient degree of heat to melt and incorporate the two articles, and when the gum and resin are perfectly melted I take the vessel off from the fire and mix in one-half pint of pure oil of turpentine. I also prepare, to form part of my composition, what I call "double-boiled" oil, which I make thus: I take one pint of the ordinary boiled oil of the trade and add thereto two ounces of red lead and two ounces of litharge, which I expose to heat in an earthen vessel in a sand bath and boil for about five minutes. I then take it from the sand bath, and while hot place in it a thin linen bag containing one ounce of the ashes of sheep's bones and one ounce of cream tartar, and, placing the vessel again in the sand bath, I expose it to a sufficient degree of heat to boil the mixture for a few minutes. I then take the vessel off from the fire and add to this mixture or solution the rind or shell of one onion and a few crumbs of bread, and then place this double-boiled oil aside for three or four days before I use it.

In making up my composition for the cloth or fabric I take one and one-half pound of the second mixture herein named—*i. e.*, the solution of the gum elastic in turpentine—and add to it one and one-half gallon of ordinary boiled oil and one and one-half gallon of the above-described double-boiled oil. I place these ingredients in an earthen vessel in a sand bath, stirring them while exposed to heat, and thus thoroughly mix or dissolve them. While warm I add to this mixture of the oils and the solution of the gum-elastic the first-recited mixture of the sugar of lead, oil of turpentine, and balsam fir, and the third-recited mixture of gum-elemi, resin, and turpentine, and under a sufficient exposure to heat thoroughly incorporate the several ingredients.

Any color desirable may be used with this composition, which is mixed or ground in boiled oil.

For making most fabrics water-tight two coats of this composition will be sufficient. For roofing, ordinarily, two will answer. For making air-tight—as in life-preservers—three coats will generally be required. One coat will dry in about thirty-six hours; two in about three days; three in about eight days. The coats may be given to the cloth or fabric in the manner in ordinary use for like purposes, and the drying be performed in the sun or in rooms artificially heated, a moderate degree of heat only being necessary.

This composition can be applied to silk, linen, cotton, and other fabrics, and used in making roofing, tents, life-preservers, or any sheet or other form of air-tight or water-proof material.

Having thus set forth my invention, what I claim as new, and desire to secure by Letters Patent, is—

The composition made of the ingredients and prepared in the manner and used for the purposes herein recited.

This specification signed this 4th day of December, 1860.

AUGUSTUS C. TEUBNER.

Witnesses:
T. T. EVERETT,
F. HARTMANN.